United States Patent
Milne et al.

(10) Patent No.: US 11,270,269 B2
(45) Date of Patent: Mar. 8, 2022

(54) REDUCING INFORMATION REQUIREMENTS IN DIGITAL ELECTRONIC TRANSFERS

(71) Applicant: Dwolla, Inc., Des Moines, IA (US)

(72) Inventors: Benjamin P. Milne, Des Moines, IA (US); Nicholas Leeper, Des Moines, IA (US); Adam James Steenhard, Urbandale, IA (US); Jason A. Mead, West Des Moines, IA (US)

(73) Assignee: Dwolla, Inc., Des Moines, IA (US)

( * ) Notice: Subject to any disclaimer, the term of this patent is extended or adjusted under 35 U.S.C. 154(b) by 220 days.

(21) Appl. No.: 16/354,051

(22) Filed: Mar. 14, 2019

(65) Prior Publication Data

US 2020/0294004 A1  Sep. 17, 2020

(51) Int. Cl.
*G06Q 20/02* (2012.01)
*G06Q 20/38* (2012.01)
*G06Q 20/10* (2012.01)
*G06Q 20/08* (2012.01)

(52) U.S. Cl.
CPC ....... *G06Q 20/027* (2013.01); *G06Q 20/0855* (2013.01); *G06Q 20/108* (2013.01); *G06Q 20/383* (2013.01)

(58) Field of Classification Search
CPC .. G06Q 20/027; G06Q 20/383; G06Q 20/108; G06Q 20/0855; G06Q 20/405; G06Q 20/4014; G06Q 20/02
See application file for complete search history.

(56) References Cited

U.S. PATENT DOCUMENTS

2013/0060708 A1* 3/2013 Oskolkov .............. G06Q 20/10
                                                                   705/75
2020/0402032 A1* 12/2020 Ramanathan ...... G06Q 20/1085

FOREIGN PATENT DOCUMENTS

KR          100659675 B1 * 12/2006 ............. G06Q 40/02

* cited by examiner

*Primary Examiner* — Patrick McAtee
*Assistant Examiner* — Vincent I Idiake
(74) *Attorney, Agent, or Firm* — Hickman Becker Bingham Ledesma LLP

(57) ABSTRACT

Systems and methods for transferring between accounts in the absence of sensitive information needed to perform a direct transfer between accounts are described herein. In an embodiment, an intermediary system receives a request to perform a digital electronic transfer of an item from a first online account to a second online account through the intermediary system, wherein the intermediary system does not have access to the sensitive information for either the first online account or the second online account. Without requesting the sensitive information for either the first online account or the second online account, the intermediary system responds to the request by: performing a first digital electronic transfer of the item from the first online account to a system account, storing data assigning the item to an intermediary account for which the intermediary system has the sensitive information, and performing a second digital electronic transfer of the item from the system account to the second online account.

10 Claims, 3 Drawing Sheets

REDUCING INFORMATION REQUIREMENTS IN DIGITAL ELECTRONIC TRANSFERS

FIELD OF THE INVENTION

The present invention relates to digital electronic transfers which require personal information for verifying online accounts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

The internet has increased the speed in which transfers can be performed between two different parties, whether they be transfers of information, funds, ownership of physical items, or software. While transfers can be performed faster over the internet, often those transactions are difficult to track, especially when little information about the participants is known.

In order to combat the difficulty of tracking digital items, requirements are often imposed that items be owned by a verified user (about whom detailed information is known) at the end of each transaction. For example, the United States Banking System depends on identity verification of all parties involved in a transaction. Thus, funds stored in an individual account must be assigned to a verified entity who acts as an owner of the funds for the funds to be transferrable. As another example, blockchain technology works by utilizing a distributed ledger across a plurality of computer systems to track transactions. Thus, for a blockchain to be updated, both the transferor and the transferee have to be identifiable.

One issue that arises from this internet-centric problem of tracking digital electronic transactions is that it can require sensitive information to be released online. For instance, an intermediary in a transaction may be required, by an external system or external regulations, to be able to identify ownership of an item transferred through the system at all times. Thus, individual accounts may need to be verified, which often requires sensitive information, such as social security numbers, birth dates, tax identification numbers, or other sensitive information.

In the modern age, sensitive information released online is rarely perfectly protected. Thus, parties to an online transaction may wish to perform the transaction without releasing the sensitive information required by the external systems to track the transactions. Additionally, transactions through an intermediary can become complicated, often requiring multiple inputs in order to proceed with any transactions that involve the use of other accounts.

Thus, there is a need for a system which can perform a transaction through an intermediary without receiving sensitive information while being operable from a sender's perspective through a single system call, such as an Application Programming Interface (API) call.

Additionally, given that latency in digital electronic transfers through an intermediary can be time intensive, there is a need for a system which can perform a transaction through an intermediary at increased speeds.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Aspects of the disclosure relate to systems and methods performing transfers between accounts in the absence of sensitive information needed to perform direct transfers. In an embodiment, the transfer facilitator system exposes an application programming interface (API) which accepts requests. The requests identify a sending account, a receiving account, and an intermediary account. If both the sending and receiving account are unverified, i.e. they have not provided sensitive information required to become verified accounts, the transfer facilitator can transfer an item from the sending account to the intermediary account which has been verified. The transfer facilitator can then transfer the item from the intermediary account to the receiving account. Thus, while the item is stored at the transfer facilitator system, the item can be assigned to a verified account despite neither the sender nor the receiver providing sensitive information.

In an embodiment, a method for transferring between accounts in the absence of sensitive information needed to perform a direct transfer between accounts comprises receiving, at an intermediary system, a request to perform a digital electronic transfer of an item from a first online account to a second online account through the intermediary system; wherein the intermediary system does not have access to the sensitive information for either the first online account or the second online account; without requesting the sensitive information for either the first online account or the second online account, the intermediary system responding to the request by: performing a first digital electronic transfer of the item from the first online account to a system account; storing data assigning the item to an intermediary account for which the intermediary system has the sensitive information; and performing a second digital electronic transfer of the item from the system account to the second online account.

SYSTEM OVERVIEW

Figure 1:
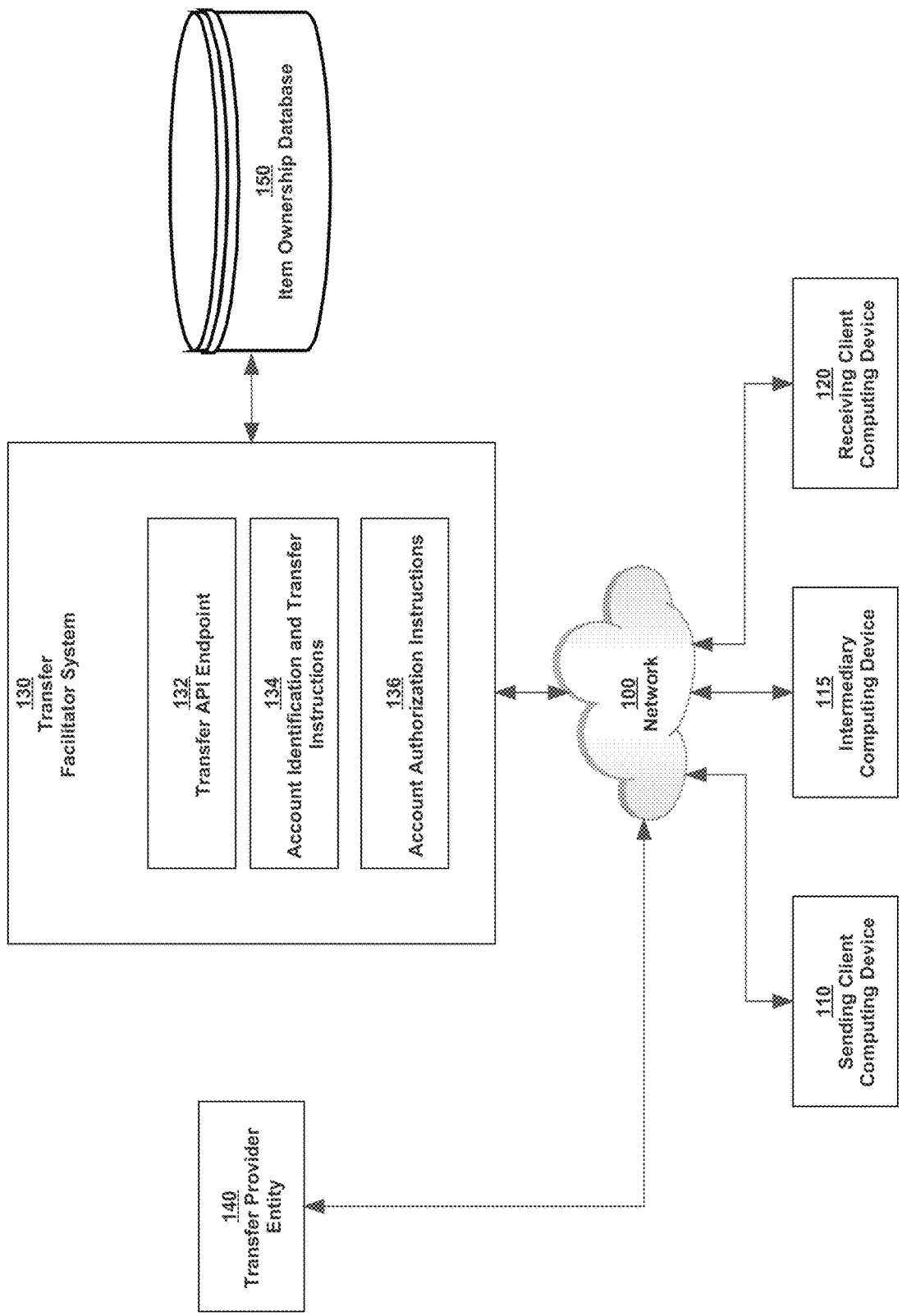
FIG. 1 depicts an example system on which example embodiments may be performed.

FIG. 1 depicts an example system on which example embodiments may be performed. In an embodiment, a transfer facilitator system 130, a sending client computing device 110, a receiving client computing device 120, and an intermediary computing device 115 communicate over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The transfer facilitator system 130, sending client computing device 110, receiving client computing device 120, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Each of sending client computing device 110, intermediary computing device 115, and receiving client computing device 120 is a computer that includes hardware capable of communicatively coupling the devices to one or more server computers, such as transfer facilitator system 130 over one or more service providers. For example, sending client computing device 110 may include a network card that communicates with transfer facilitator 130 through a home or office wireless router (not illustrated in FIG. 1) coupled to an interne service provider. Each of sending client computing device 110, intermediary computing device 115, and receiving client computing device 120 may be a smart phone, personal computer, tablet computing device, PDAs, laptop, or any other computing device capable of transmitting and receiving information and performing the functions described herein.

Transfer facilitator system 130 may be implemented using a server-class computer or other computers having one or more processor cores, co-processors, or other computers. Transfer facilitator system 130 may be a physical server computer and/or a virtual server instance stored in a data center, such as through cloud computing. In an embodiment, transfer facilitator system 130 comprises a transfer application programming interface (API) endpoint 132. The transfer facilitator system 130 may be configured to perform transfers described herein in response to receiving a query through the transfer API endpoint 132 identifying a requester, a receiver, and an intermediary.

Account identification and transfer instructions 134 comprise computer readable instructions which, when executed by the transfer facilitator system 130 cause the transfer facilitator system 130 to identify one or more accounts for transfer of an item and to initiate transfer of said idem. Account authorization instructions 136 comprise computer readable instructions which, when executed by the transfer facilitator system 130, cause the transfer facilitator system 130 to request and receive authorization for storing an item in an intermediary account.

Transfer provider entity 140 comprises an entity separate from the transfer facilitator system which provides items to the transfer facilitator system 130 for performing faster transfers. The transfer provider entity 140 may communicate with the transfer facilitator system 130 over one or more networks, such as network 100. The transfer provider entity 140 may comprise a computer that includes hardware capable of communicatively coupling the transfer provider entity 140 to the transfer facilitator systems. Additionally or alternatively, the transfer provider entity may comprise an API endpoint for receiving and responding to requests from the transfer facilitator system 130.

Item ownership database 150 may comprise a database for storing data relating to the ownership of items stored by the transfer facilitator system 130. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein. Item ownership database 150 may be implemented through a physical server computer system and/or a virtual server instance stored in a data center, such as through cloud computing.

For purposes of illustrating a clear example, FIG. 1 shows a limited number of instances of certain functional elements. However, in other embodiments, there may be any number of such elements. For example, embodiments may use thousands or millions of different client computing devices associated with different users. Further, the system 130 and/or transfer provider entity 140 may be implemented using two or more processors, cores, clusters, or instances of physical machines or virtual machines, configured in a discrete location or co-located with other elements in a datacenter, shared computing facility or cloud computing facility.

Unverified Transfer

Figure 2:
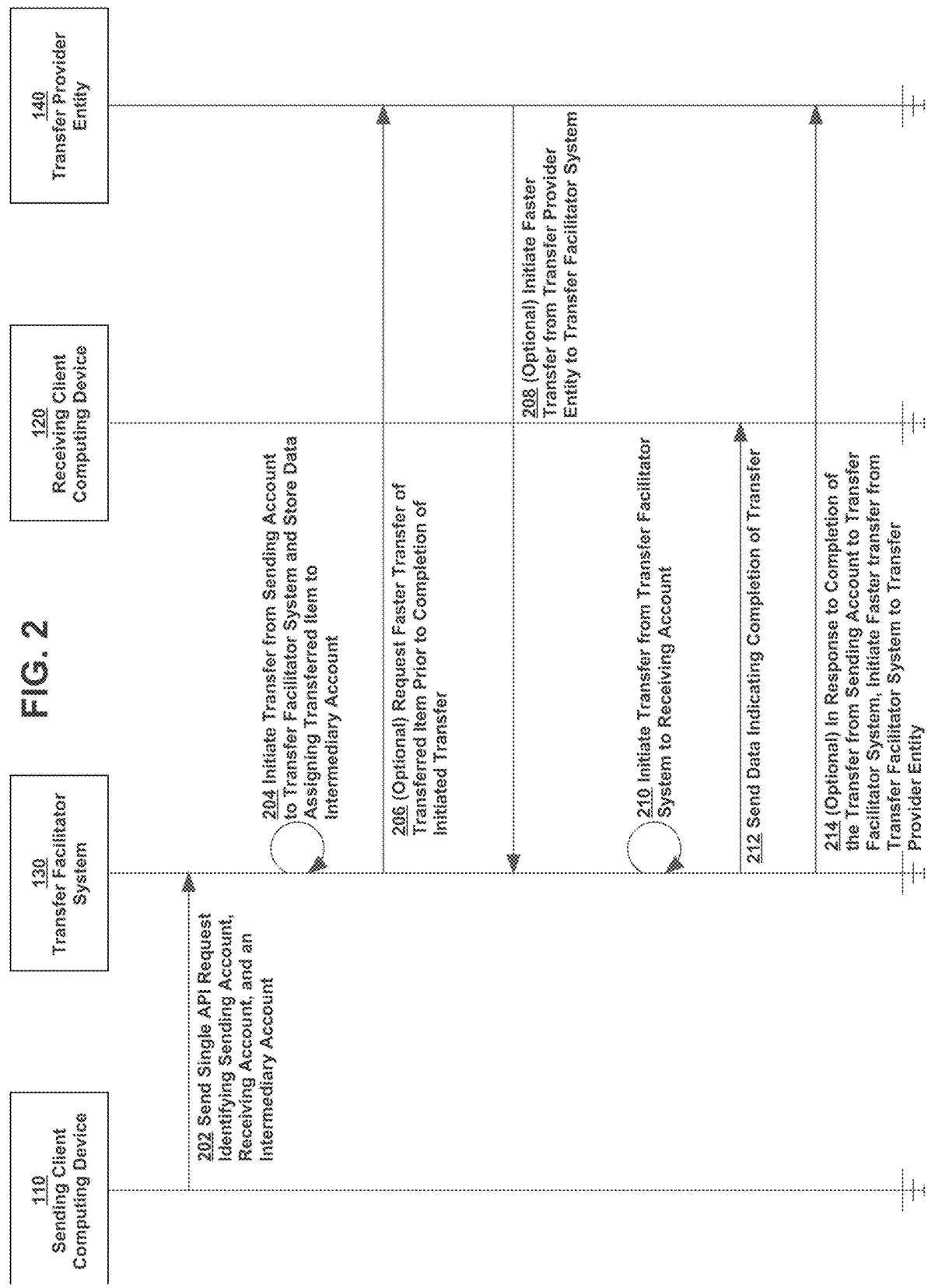
FIG. 2 depicts an example method for performing a transfer of an item between accounts in the absence of sensitive information needed to perform a direct transfer between accounts.

FIG. 2 depicts an example method for performing a transfer of an item between accounts in the absence of sensitive information needed to perform a direct transfer between accounts. The item may be either a physical item to be transferred and/or a digital electronic item to be transferred. For example, currency may be transferred through an automated clearinghouse (ACH) transfer. Additionally or alternatively, cryptocurrency may be transferred electronically with records of the transaction being stored on decentralized computing systems, such as a blockchain.

At step 202, the sending client computing device 110 sends a single API request identifying a sending account, receiving account, and an intermediary account to the transfer facilitator system 130. For example, the transfer facilitator 130 may provide an API interface for performing unverified item transfers which is configured to receive API requests for item transfers that identify a receiving account, a sending account, and an intermediary account. An unverified transfer, as used herein, refers to a transfer where sensitive information needed to perform a complete transfer through an intermediary system is not received. For example, while the request to send the item may identify sending and receiving accounts, sensitive information, such as social security numbers or dates of birth, may not be received.

At step 204, the transfer facilitator system 130 initiates a transfer from the sending account to the transfer facilitator system and stores data assigning a transferred item to an intermediary account. The intermediary account may be a verified account, such that the sensitive information required for the transfer for the intermediary account has been received by the transfer facilitatory system 130. When the transfer facilitator system 130 initiates the transfer from an account associated with the sending account, the transfer facilitator system 130 is able to transfer directly into the intermediary account which has been verified. Thus, while the item is stored at the transfer facilitator system, it is stored in a verified account, thereby fulfilling chain of title requirements.

In an embodiment, the transfer facilitator system 130 receives authorization for the intermediary account to be assigned to the transferred item. For example, the transfer facilitator system 130 may receive data indicating that the intermediary account has received one or more required licenses to store one or more items on behalf of one or more other users, including but not limited to, a user corresponding to the sending client computing device 110 and/or a user corresponding to the receiving client computing device 120.

In an embodiment, the transfer facilitator system 130 updates the item database during an unverified transfer. For example, the transfer facilitator system may initiate the transfer between the sending account and the intermediary account. The transfer facilitator system may update the item database to indicate that the item stored by the transfer facilitator system 130 is owned by the verified intermediary. Thus, the item database would indicate that a first transfer occurred between the sending account and the verified intermediary account with the item being stored at the transfer facilitator system 130 while it is under ownership of the verified intermediary.

At step 210, the transfer facilitator system 130 initiates a transfer from the transfer facilitator system to a receiving account. For example, the transfer facilitator system may transfer the item from the intermediary account to the sending account. The transfer facilitator system may also update the item database to indicate that the item has been transferred from the intermediary account to the receiving account. Thus, the item database indicates that ownership of the item passed from an unverified sender to a verified intermediary when it was stored at the transfer facilitator system 130 to an unverified receiving account.

At step 212, the transfer facilitator system 130 sends data to the receiving client computing device 120 indicating completion of the transfer. For example, the transfer facilitator system 130 may send a message to a computing device associated with the unverified receiving account indicating that the transaction has been completed.

In an embodiment, the transfer facilitator system 130 performs the steps of the above transfer in response to a single system call, such as an API call. For example, in response to the single API request for a transfer of an item from the sending account to the receiving account, the transfer facilitator system may perform a first transfer of the item from the sending account to an intermediary account, store data indicating that the transferred item belongs to a verified intermediary while stored at the transfer facilitator system, and perform a second transfer of the item from the intermediary account to the receiving account.

The transfer facilitator system 130 may additionally utilize fail-safes in case the transfer of the item is unsuccessful. For example, the transfer facilitator system 130 may perform the first transfer from the sending account to the intermediary account, but be unable to perform a transfer to the receiving account, such as when the receiving account has been closed and/or misidentified. In response to determining that the transfer facilitator system 130 is unable to complete the transfer to the receiving account, the transfer facilitator system 130 may send a notification to the computing device associated with the sending account indicating that the transfer failed. In an embodiment, the transfer facilitator system returns the transferred item to the sending account. Additionally or alternatively, the transfer facilitator system may request an identifier of a different receiving account while storing the item. In response to receiving input specifying the different receiving account, the transfer facilitator system may attempt to perform a transfer from the intermediary account to the different receiving account.

Verifying the Intermediary Account

In an embodiment, the transfer facilitator system 130 initially receives data verifying the intermediary account. For example, the transfer facilitator system may receive verifying information, such as social security number, tax identification number, date of birth, internet protocol (IP) address, and/or other data required to verify the intermediary account for transaction. The verification data may be defined by transfer protocol requirements. For example, if a cryptocurrency requires an IP address and a tax identification number for ownership of the cryptocurrency, the transfer facilitator system 130 may request an IP address and tax identification number from the intermediary computing device for verifying the intermediary account.

In an embodiment, the transfer facilitator system 130 additionally receives authorization from the intermediary computing device to assign ownership of transferred items to the intermediary account. The authorization may be a general authorization to use the intermediary account for any transfers and/or a specific authorization for one or more specific accounts. For example, the transfer facilitator system 130 may receive authorization data from the intermediary computing device which identifies one or more specific accounts. When the transfer facilitator system 130 receives a request to perform a transfer which identifies the intermediary account as the verified account for the transfer, the transfer facilitator system 130 may determine whether the sending account has been authorized by the intermediary computing device before completing the transfer.

Performing a Faster Transfer

Due to the nature of different types of transfers, a transfer through an intermediary account can be time intensive. While the use of an intermediary account can speed up transfers of some items, the transfers may be slowed by the transfer facilitator system 130 waiting for completion of the first transfer from the sending account to the transfer facilitator system prior to initiating a second transfer from the transfer facilitator system 130 to the receiving account.

In an embodiment, the transfer facilitator system 130 uses a transfer provider to decrease the amount of time a transfer takes to complete. The transfer provider comprises a system that is capable of performing a transfer to the transfer facilitator system 130 at increased speeds. For example, the transfer provider may be geographically close to the transfer facilitator system such that a physical item is capable of being transferred to the transfer facilitator system faster from the transfer provider than from the sending account. Additionally or alternatively, the transfer provider may have an account at a same financial institution as the transfer facilitator system. Thus, the transfer provider may be capable of performing a direct inter-institution transfer between the transfer provider and the transfer facilitator system while a transfer from the sending account to the transfer facilitator system may be performed at a slower speed through an ACH transfer.

In an embodiment, upon receiving the API request from the sending account, the transfer facilitator system, in addition to initiating a transfer from the sending account to the transfer facilitator system, initiates a transfer from the transfer provider to the transfer facilitator system. Then, without waiting for completion of the transfer from the sending account to the transfer facilitator system, the transfer facilitator system initiates the transfer from the transfer facilitator system to the second account. Thus, the transfer facilitator system is able to utilize the transfer provider to decrease the time it takes to complete an electronic digital transfer of an item. After the transfer has completed, the transfer facilitator may initiate a transfer from the transfer facilitator system to the transfer provider.

As a practical example, a sending client computing device may store a particular sum of cryptocurrency. Due to latency between the sending client computing device and the transfer facilitator system or latency between the sending client computing device and other verification systems, the transfer of the cryptocurrency to the transfer facilitator system may be time intensive. Thus, the transfer facilitator system may request a transfer of the particular sum of cryptocurrency from the transfer provider which has a much lower latency. The transfer facilitator system is then able to initiate a transfer from the transfer facilitator system to a receiving client computing device of the particular sum of cryptocurrency without waiting for the first transfer to be completed.

When the transfer provider completes the transfer to the transfer facilitator system, the transfer facilitator system may store the transferred item in the intermediary account, thereby assigning ownership of the transferred item to the verified intermediary. Thus, chain of title can be preserved from the transfer provider to the second account. Additionally or alternatively, when the first transfer is completed, the transfer facilitator system may store the transferred item in the intermediary account, thereby assigning ownership of the transferred item to the verified intermediary prior to sending the transferred item to the transfer provider.

In an embodiment, the transfer facilitator system acts as the transfer provider if the item to be transferred is stored at the transfer facilitator system. For instance, after initiating transfer of an item from the sending account to the transfer facilitator system but before completion of the transfer, the transfer facilitator system may determine that the transfer facilitator system is capable of performing a transfer to the receiving account. As an example, the transfer facilitator may store 10 coins of a particular cryptocurrency. If the sending client computing device is attempting to transfer 2 coins to the receiving computing device, the transfer facilitator may send 2 of the 10 stored coins to the receiving computing device prior to completing the transfer with the sending computing device.

The methods described herein can also be used to increase the speed of transactions in multiple directions. For instance, a transaction may include a first transfer from a first computing device to a second computing device and a transfer from the second computing device to the first computing device. As an example, a first account may transfer money to a second account in return for cryptocurrency from the second account. The transfer facilitator system may initiate the transfer of the funds from the first account to the second account and, without waiting for completion of the transfer, perform a faster transfer of the funds from the transfer provider to the transfer facilitator system and a transfer of the funds from the transfer facilitator system to the second account. In the opposite direction, the transfer facilitator may initiate a transfer of the cryptocurrency from the second account to the transfer facilitator system and, without waiting for completion of the transfer, perform a faster transfer of the cryptocurrency from the transfer provider to the transfer facilitator system and a transfer of the cryptocurrency from the transfer facilitator system to the first account. When the first and second transfer complete respectively, the transfer facilitator system may perform final transfers from the transfer facilitator system to the transfer provider.

By utilizing the transfer provider in transfers in both directions, the transfer facilitator system is able to reduce latency in a bidirectional transfer by almost simultaneously performing each of four parts of a transfer. For instance, a bidirectional transfer through an intermediary can include four different transfer times, one from the first account to the transfer facilitator system, one from the transfer facilitator system to the second account, one from the second account back to the transfer facilitator, and a final transfer from the transfer facilitator to the first account. In embodiments described herein, the transfer facilitator can initiate two initial transfers, perform faster transfers without waiting for completion of the initial transfers, and perform the final transfer. Thus, instead of a transaction time of four transfers, the transaction time is reduced to the time of the faster transfer added to the time of the final transfers.

Benefits of Certain Embodiments

Embodiments described herein allow for the performance of tracked digital electronic transactions while minimizing the amount of information required from either party. By utilizing an intermediary account that can be assigned ownership of the transferred item, a transfer facilitator system is able to perform transfers of digital electronic items which cannot be transferred to accounts that have not been verified by an external system. Thus, for items where tracking of ownership is required, either through verification systems or regulations, the system is able to act as a transfer intermediary to ensure that items are transferred without personal information being released over the internet.

Additionally, the systems and methods described herein may be used to reduce latency in digital electronic transfers over the internet by utilizing transfer provider or by having the transfer facilitator system act as a transfer provider. Thus, for situations where connectivity issues or transfer protocols reduce the speeds of initial transfers, the transfer facilitator system is able to reduce latency by obtaining the transferred item from a separate source and using the transferred item to complete the transfer. Additionally, transfer speeds may be reduced in bidirectional transfers in a same manner with latency in transfers in both directions being reduced. In an embodiment, the transfer facilitator performs transfers in both directions simultaneously, thereby further increasing the speed of online transactions.

The systems and methods described additionally reduce the complexity of instigating the transfers described herein by providing a single API interface for performing a complex transfer. Using the methods described herein, the complete process of transferring from a sending account to an intermediary account, assigning the transferred item to the intermediary account, and transferring from the intermediary account to the receiving account can be performed in response to a single API call, thereby reducing the complexity of requesting performance of the transactions and allowing the transfer facilitator system to perform the transactions automatically without requiring action to be taken by the intermediary account for each transfer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
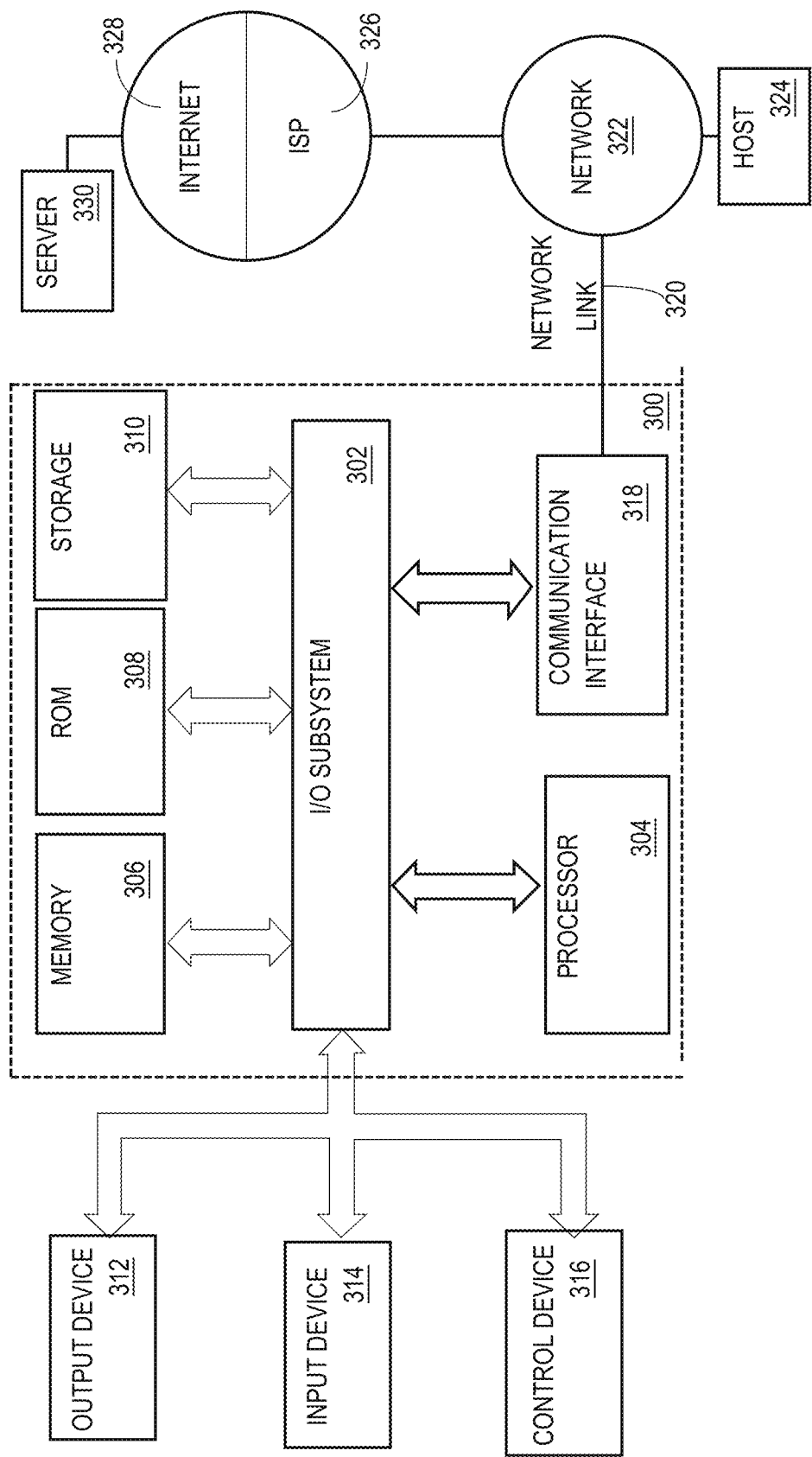
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for improving security during a digital electronic transfer of an item between online accounts over a network by performing the digital electronic transfer between the online accounts without requiring sharing of sensitive information needed to perform a direct transfer of the item between the online accounts, comprising:
   receiving, at an intermediary system, a request to perform a digital electronic transfer of the item from a first online account to a second online account through the intermediary system;
   wherein the request includes data that identifies the second online account that is to receive the item in the digital electronic transfer;
   wherein the intermediary system does not have access to the sensitive information for either the first online account or the second online account;
   without receiving the sensitive information for either the first online account or the second online account, the intermediary system responding to the request by:
      performing a first digital electronic transfer of the item from the first online account to a system account;
      storing data assigning ownership of the item to an owner of an intermediary account for whom the intermediary system has the sensitive information; and
      performing a second digital electronic transfer of the item from the system account to the second online account; and
      wherein performing the second digital electronic transfer includes the intermediary sending to a system that manages the second online account the data that identifies the second online account to enable the system to identify the second online account as the online account to receive transfer of the item.

2. The method of claim 1, further comprising:
   prior to completion of the first digital electronic transfer, requesting a transfer from a transfer provider entity that is faster than the first digital electronic transfer;
   receiving a first transfer from the transfer provider entity to the system account;
   in response to receiving the first transfer, performing the second digital electronic transfer from the system account to the second online account;
   in response to performing the first digital electronic transfer, performing a second transfer from the system account to the transfer provider entity.

3. The method of claim 1, further comprising, prior to completion of the first digital electronic transfer, determining that the system account is capable of performing the second digital electronic transfer and, in response, performing the second digital electronic transfer.

4. The method of claim 1, wherein the request to perform the digital electronic transfer is a single API call that identifies the first electronic account, the second electronic account, and the intermediary account.

5. The method of claim 1, wherein performing the second digital electronic transfer comprises:
   receiving data indicating that the second digital electronic transfer was unable to be completed and, in response, causing displaying on a client computing device associated with the first online account of an option for updating information identifying the second online account;

in response to receiving input updating the information identifying the second online account, performing the second digital electronic transfer.

6. A system comprising:

one or more processors;

a memory storing instructions which, when executed by the one or more processors, causes performance of:

receiving, at an intermediary system, a request to perform a digital electronic transfer of an item from a first online account to a second online account through the intermediary system;

wherein the request includes data that identifies the second online account that is to receive the item in the digital electronic transfer;

wherein the intermediary system does not have access to the sensitive information for either the first online account or the second online account;

without receiving the sensitive information for either the first online account or the second online account, the intermediary system responding to the request by:

performing a first digital electronic transfer of the item from the first online account to a system account;

storing data assigning ownership of the item to an owner of an intermediary account for whom the intermediary system has the sensitive information; and performing a second digital electronic transfer of the item from the system account to the second online account; and wherein performing the second digital electronic transfer includes the intermediary sending to a system that manages the second online account the data that identifies the second online account to enable the system to identify the second online account as the online account to receive transfer of the item.

7. The system of claim 6, wherein the instructions, when executed by the one or more processors, further cause performance of:

prior to completion of the first digital electronic transfer, requesting a faster transfer from a transfer provider entity that is faster than the first digital electronic transfer;

receiving a first transfer from the transfer provider entity to the system account;

in response to receiving the first transfer, performing the second digital electronic transfer from the system account to the second online account;

in response to performing the first digital electronic transfer, performing a second transfer from the system account to the transfer provider entity.

8. The system of claim 6, wherein the instructions, when executed by the one or more processors, further cause performance of, prior to completion of the first digital electronic transfer, determining that the system account is capable of performing the second digital electronic transfer and, in response, performing the second digital electronic transfer.

9. The system of claim 6, wherein the request to perform the digital electronic transfer is a single API call that identifies the first electronic account, the second electronic account, and the intermediary account.

10. The system of claim 6, wherein performing the second digital electronic transfer comprises:

receiving data indicating that the second digital electronic transfer was unable to be completed and, in response, causing displaying on a client computing device associated with the first online account of an option for updating information identifying the second online account;

in response to receiving input updating the information identifying the second online account, performing the second digital electronic transfer.

* * * * *